Feb. 1, 1938.  W. H. HAAS  2,106,736
VALVE ASSEMBLY
Filed Feb. 13, 1935
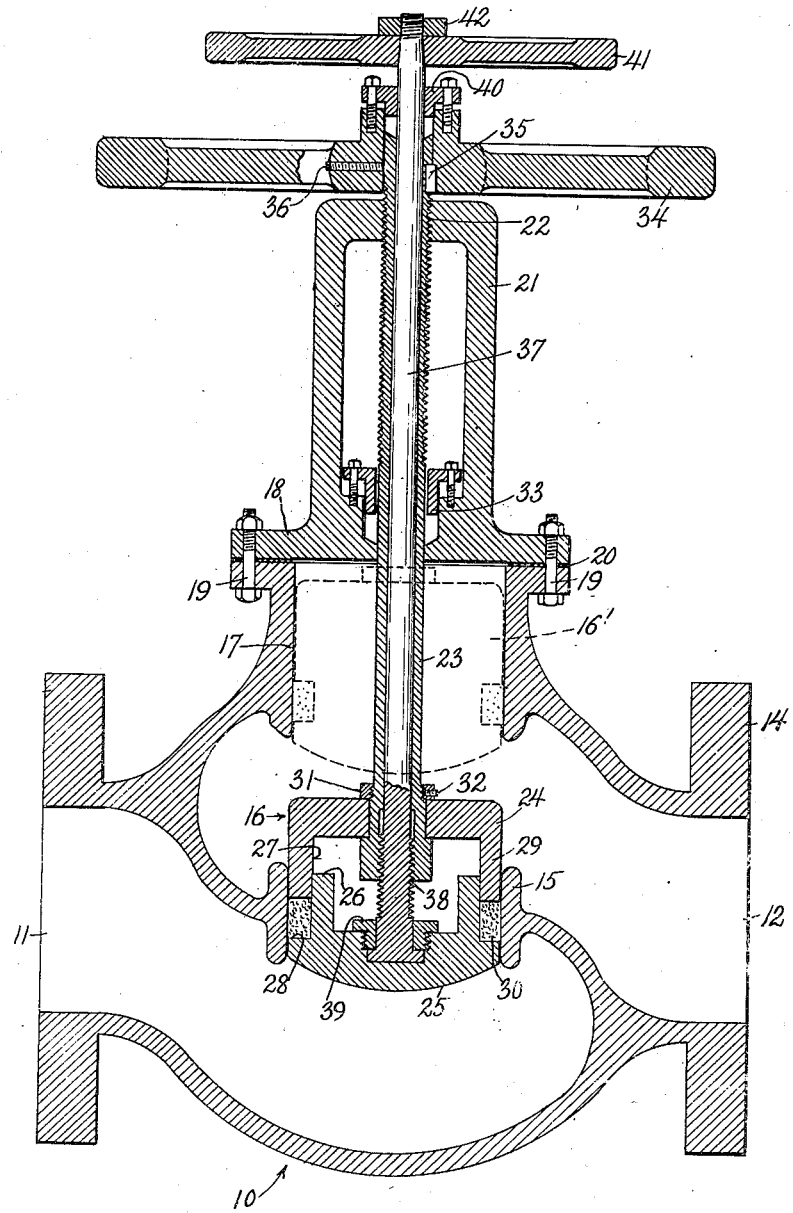
INVENTOR
WALTER H. HAAS.
BY
ATTORNEY Patented Feb. 1, 1938

2,106,736

UNITED STATES PATENT OFFICE 2,106,736

VALVE ASSEMBLY

Walter H. Haas, United States Navy

Application February 13, 1935, Serial No. 6,292

1 Claim. (Cl. 251—27)

(Granted under the act of March 3, 1883, as amended April 30, 1928; 370 O. G. 757)

This invention relates to a valve and has for an object to provide an improved valve assembly and method of operating same wherein the valve will be absolutely tight in both the open and the closed positions, thereby eliminating wear, replacement of packing and valve bodies and all possibility of leakage through the valve.

In the usual type of valve assembly it is customary to rely on a packing in the stem for insuring tightness, but inasmuch as the stem ordinarily travels through this packing from open to closed position and vice versa, it is obvious that wear necessarily takes place on the stem packing and that the stem packing will soon reach a degree of looseness that will permit leakage of the medium which is traversing the valve. It is also customary to rely on a metal stressed to metal contact for at least the closed position and as the metal may wear unevenly, leakage may take place past the valve in the closed as well as the open position. It is the purpose of this invention to eliminate all this possibility of leakage, wear and replacements, and to provide a valve which in both the open and closed position is absolutely tight and does not have any metal to metal stressed contact except while the valve is at rest in either of its seats. For the accomplishment of this purpose I have devised a method of operation and a valve in which a packing is used which is compressed to insure tightness only when in each of the open or closed positions, but is released from compression stress when being moved from one position to the other so that there will be no wear on this packing.

Reference is to be had to the accompanying drawing forming a part of this specification in which the figure is a sectional view through the valve illustrative of this invention.

There is shown at 10 a valve body having an inlet passage 11 and an outlet passage 12 leading from between the valve seat bores 15, 17. Flanges 13 and 14 are provided for securing the valve body 10 in any pipe line in which it is to be used. The inlet passage 11 is connected to the outlet passage 12 through a cylindrical valve seat 15. A valve member generally shown at 16 cooperating with the valve seat 15 closes the connection between the passage 11 and outlet passage 12. A second cylindrical seat 17 is provided for receiving the valve member 16 in the position 16' permitting the valve 16 to be withdrawn to the open position 16' and allowing the medium to flow through the inlet passage 11 through the cylindrical seat 15 and out between 15 and 17 through the outlet passage 12. The cylindrical seat 17 is closed off by a bonnet 18 secured thereto by means of bolts 19 and a gasket 20.

Extending upwardly from the bonnet 18 is a yoke 21 through which is threaded as at 22 an external valve stem sleeve 23. The valve member 16 consists of an upper valve part 24 and a lower valve part 25. Both the upper valve part 24 and the lower valve part 25 are cylindrical in shape and have substantially the same maximum diameter, which diameter is slightly less than the diameter of the valve seat 15. One of the valve parts as 25 is provided with a projecting cylindrical flange 26 while the other valve part 24 of the valve parts is provided with a cylindrical recess 27. The external diameter of the cylindrical flange 26 and the internal diameter of the cylindrical recess 27 are substantially identical whereby the cylindrical flange 26 of valve part 25 may telescope within the valve part 24. The cylindrical flange 26 forms a shoulder 28 having the same width as the projecting flange 29 formed by the recess 27 in the upper valve part 24.

A compressible or stressable packing 30 placed on the shoulder 28 is adapted to be compressed stressed thereagainst, and against the bore of either 15 or 17, by the flange 29 as the cylindrical flange 26 is telescoped into the upper valve part 24. As the packing 30 is compressed vertically it tends to expand horizontally until it comes into stressed contact with either the cylindrical seat 15 or the cylindrical seat 17 depending whether the valve 16 is in a closed position as shown or the open position 16' shown in dotted outline.

The position of the valve 16 as a whole is controlled by the valve stem sleeve 23 which is secured by means of a nut 31 and set screw 32 to the upper valve part 24. A packing gland 33 prevents leakage along the outer sleeve stem 23 through bonnet 18 while the valve is being moved between its open and closed positions. The stem sleeve 23 is moved on its threads 22 by means of the main gatewheel 34 keyed thereto as at 35 and if necessary provided with a set screw 36. The lower valve part 25 is moved relatively to the upper part 34 by means of a valve stem 37 which extends through the sleeve stem 23 and is threaded thereto as at 38. The stem 37 is rotatably secured to the lower valve part 25 by means of a flange nut 39. In order to prevent leakage between the lower part valve stem 37 and the upper part valve stem sleeve 23 a packing gland 40 is secured at the upper end of the valve sleeve stem 23 about the valve stem 37. An auxiliary gatewheel 41 secured to the upper end of valve stem 37 by nut 42 serves to control the operation of the stem 37 and of the lower valve part 25.

In operation, the valve member 16 may be set in either the full open position as at 16' or in full closed position as at 16 by means of the main gatewheel 34 after the auxiliary gatewheel 41 has been operated to move the upper valve part 34 a sufficient distance relative to the lower valve part 25 so as to release the packing 30 from compression. With the packing 30 released from compression the main gatewheel 34 is operated to place the valve 16 in either the open or closed position. When in the desired position the auxiliary gatewheel 41 is rotated so as to draw the lower valve part 25 closer to the upper valve part 24 thereby compressing the packing 30 until it comes into absolute tight contact with the cylindrical walls of the valve seat 15 or 17, it being observed that the valve member 16 as a whole is in the form of a piston valve while the packing 30 is in the form of a compressible piston ring.

When the valve is in closed position as shown in full lines, the packing 30 and the solid lower valve part 25 and the valve seat 15 are the only parts that are at all exposed to the pressure of the medium in the inlet passage 11. Inasmuch as the packing 30 is recompressed at each operation of closing the valve, there is no possibility of leakage passing the valve when properly closed, no packing glands being exposed to the pressure of the medium except during the temporary transition period when the valve 16 is being moved to either open or closed position.

In order to open the valve the auxiliary gatewheel 41 is operated to release the packing 30 from compression stress against the bore of valve seat 15. The main gatewheel 34 is operated to move the entire piston valve 16 to the open valve position 16' and then the auxiliary gatewheel 41 is again operated to recompress the packing 30 into stress-contact with the units of piston valve 16 and the bore of valve seat 17. When thus recompressed and in said stress contact the pressure of the medium in 11 cannot reach any of the packing glands 33 or 40, or the gasket 20, and hence the valve is kept absolutely tight in the open position. It will be further observed that there is no metal or other stress to metal contact between the cylindrical wall of the piston valve 16 and the cylindrical wall of the valve seats 15 or 17 while the same are in relative motion, inasmuch as the sealing stress contact comes through the horizontal expansion of the piston packing ring 30 as it is vertically compressed through the telescopic action of the lower valve part 25 and the upper valve part 24.

It will be, from the foregoing, readily understood that the above described method of operation enables all sizes of valves to be readily opened and closed with very little force, regardless of how long they may have remained in one position; that said valve, and that valves of all structures operated by said method, will be subjected to practically negligible friction, and require practically no replacement of packing gland or of valve seats or bodies and withstand all leakage through the valve when in its closed or opened positions; that the method may be practiced by other valve structures with or without modification; that where modification may be required the same may be made by those of ordinary skill from this disclosure; that said valve, as well as said method of operation, may be inexpensively installed and conveniently practiced with the result that valves operated by said method may be in efficient service throughout manyfold the service life of valves not so operated.

The invention described herein may be manufactured and used by or for the Government of the United States of America for governmental purposes without the payment of any royalties thereon or therefor.

What is claimed is:

A valve assembly comprising a valve body, a pair of spaced aligned cylindrical valve seats in said valve body, a piston valve member, a packing ring on said valve member, said piston valve member including two valve member parts, one telescoped within the other with the inner of said valve member parts having an extending flange whose diameter is substantially equal to the diameter of the other valve member part, said packing ring being located between said extended flange and said other valve member part whereby it is adapted to be expanded into cooperation with either seat, and means for expanding and releasing the pressure on said ring for movement between said seats including a hollow valve stem secured to the upper of said valve member parts and a valve rod extending through said valve stem secured to the other of said valve member parts, the means for securing the hollow valve stem and valve rod to their respective valve member parts including a counterbored recess in the lower valve member part, an abutment on said valve rod, a flange bushing on said rod above said abutment threaded into said counterbored recess thereby rotatably securing said valve rod to said lower valve member part, an abutment on the hollow stem within the upper valve member part and a nut threaded on said hollow stem without the upper valve member part to secure said hollow stem thereto, the abutment of said hollow stem being internally threaded and cooperative with threads on said valve rod extending therethrough, an auxiliary hand wheel on the valve rod for moving said valve rod axially relative to said hollow stem and thereby telescoping said valve member parts toward or from each other to compress or release the compression on the packing ring therebetween, and a main hand wheel on said hollow stem for rotating said hollow stem to move said valve member parts as a unit from one seat to the other when the compression on the packing ring has been released.

WALTER H. HAAS.